United States Patent [19]

Borsboom et al.

[11] Patent Number: 4,981,661
[45] Date of Patent: Jan. 1, 1991

[54] PROCESS FOR CONVERTING AND REMOVING SULFUR COMPOUNDS FROM A CO CONTAINING GAS

[75] Inventors: Johannes Borsboom, Rijswijk; Jan A. Lagas, Monnickendam, both of Netherlands

[73] Assignee: Comprimo B.V., Amsterdam, Netherlands

[21] Appl. No.: 295,749

[22] Filed: Jan. 10, 1989

[30] Foreign Application Priority Data

Jan. 13, 1988 [NL] Netherlands ............... 8800072

[51] Int. Cl.$^5$ ............... B01J 8/00; C01B 17/00; C01B 17/16; C07C 11/24
[52] U.S. Cl. ............... 423/244; 423/230; 423/245.1; 423/563
[58] Field of Search ............... 423/230, 244 A, 244 R, 423/245.1, 564

[56] References Cited

U.S. PATENT DOCUMENTS 4,371,507  2/1983  Farha et al. ............... 423/230
4,735,788  4/1988  Voirin ............... 423/230

OTHER PUBLICATIONS

"TVA Still High on Ammonia-From-Coal Project", C&EN, Jun. 4, 1979, pp. 27-29.
"The Water-Gas Shift Reaction", David S. Newsome, Catal. Rev.-Sci. Eng., 21(2), 275-318 (1980), pp. 274-318.

Primary Examiner—Gregory A. Heller
Attorney, Agent, or Firm—Weingarten, Schurgin, Gagnebin & Hayes

[57] ABSTRACT

A process is described for converting carbon oxylsulfide and/or carbon disulfide, possibly in combination with hydrogen cyanide, $O_2$ and/or $SO_2$ in a reducing CO containing gas stream by the catalytic hydrolysis of COS and $CS_2$, followed by the removal of $H_2S$, present and formed, from the gas stream. According to the invention, the process is characterized by (a) a first stage comprising converting a portion of the CO present with water in the presence of a catalyst with simultaneous or subsequent hydrogenation of any $O_2$ and/or $SO_2$ that may be present;
(b) a second stage comprising catalytically hydrolysing COS and/or $C_2$, possibly in combination with HCN in the gas stream, with water; and
(c) a third stage comprising removing substantially all sulfur components from the gas stream;

the catalytic conversion of CO in stage (a) being effected so that the heat thereby produced is substantially sufficient to raise the temperature of the gas stream to the value required for the hydrogenation and for the second stage.

14 Claims, 1 Drawing Sheet

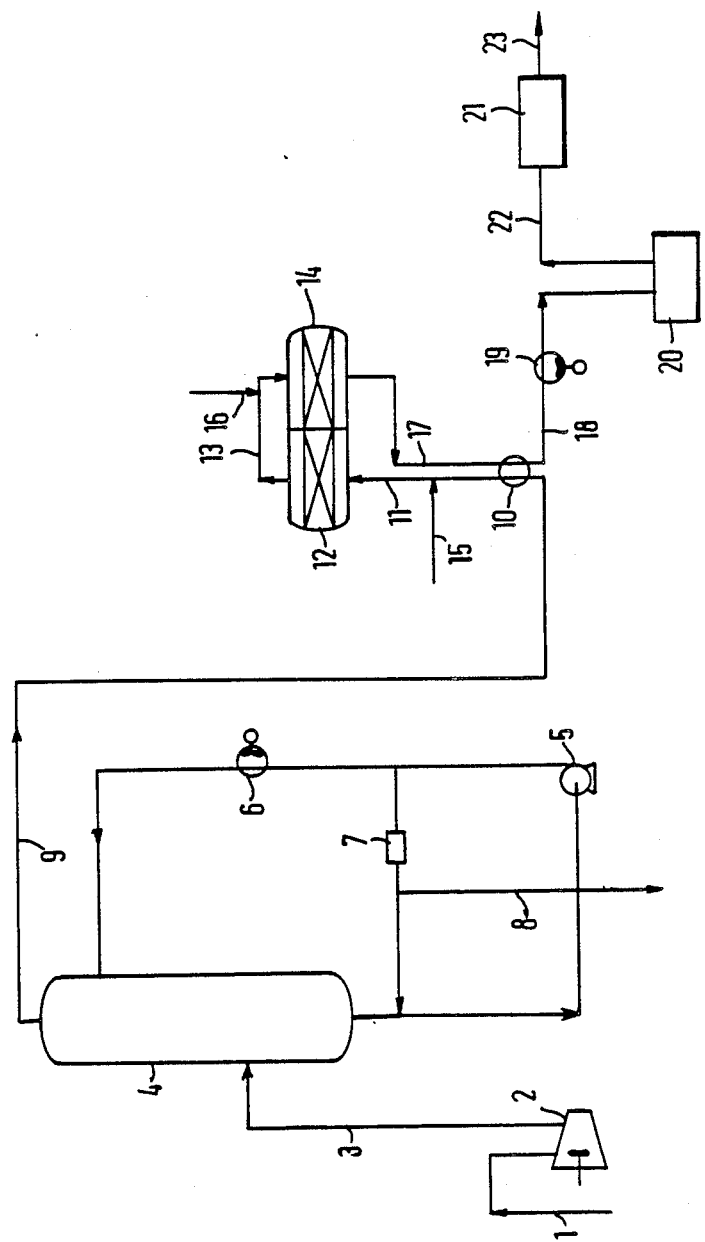

PROCESS FOR CONVERTING AND REMOVING SULFUR COMPOUNDS FROM A CO CONTAINING GAS

This invention relates to a process for converting carbon oxysulfide and/or carbon disulfide, possibly in combination with hydrogen cyanide, $O_2$ and/or $SO_2$ in a reducing CO containing gas stream by the catalytic hydrolysis of COS and $CS_2$, followed by the removal of $H_2S$, present and formed, from the gas stream.

Gases from chemical processes may contain a large number of chemically widely different components. Thus gas from a coal gasification process commonly contains hydrogen, carbon monoxide, carbon dioxide, methane and higher hydrocarbons, nitrogen, water vapour, hydrogen sulfide, carbon oxysulfide, carbon disulfide, and sometimes also oxygen, ammonia, sulfur dioxide and hydrogen cyanide.

The components containing sulfur should often be removed from the gas, either to prevent catalyst poisoning in processes after the gasification stage, or to comply with the ever more severe requirements as regards sulfur dioxide emission.

Two sulfur containing components which, chemically, are rather inert, are carbon oxysulfide, COS, and carbon disulfide $CS_2$. It is generally difficult for these components to be removed from a gas stream, in view of their inert character.

Many sulfur removing processes are based on the removal of the chemically reactive $H_2S$. Desulfurization processes based on amines make use of the acid character of $H_2S$. Other desulfurizing processes dissolve $H_2S$ in an alkaline solution, whereafter the sulfide is oxidized to form elemental sulfur. Examples of these last processes, sometimes referred to as Redox processes, are the Stretford, SulFerox and Lo-Cat processes.

In the above processes, COS and $CS_2$ are not removed, or to a limited extent only, so that in many cases the $SO_2$ emission requirements are not satisfied. It is therefore mostly necessary for COS and $CS_2$ to be first converted into $H_2S$, which is chemically better accessible. The method most often employed comprises hydrolysing COS, $CS_2$, and also HCN, in the gaseous phase with steam in accordance with the following reactions:

$$COS + H_2O \rightarrow CO_2 + H_2S \quad (1)$$

$$CS_2 + 2H_2O \rightarrow CO_2 + 2H_2S \quad (2)$$

$$HCN + H_2O \rightarrow NH_3 + CO \quad (3)$$

The hydrolysis of HCN is also desirable, because this component often has a disturbing effect in desulfurization processes by forming compounds which cannot be regenerated.

The above reactions are equilibrium reactions, i.e., they are generally not quite irreversible. The reaction is made possible by means of a catalyst. Thermodynamically, the equilibrium of the hydrolysis reactions is shifted to the right-hand side by decreasing the temperature, so that as low a reaction temperature as possible favours the conversion into $H_2S$. This reaction temperature is determined by the activity of the catalyst. Catalysts for the hydrolysis of COS/$CS_2$/HCN are well known to those skilled in the art.

Active hydrolysis catalysts for COS which are active at 150°-200° C. may be based upon Pt or chromium oxide on a carrier material. A different type of catalyst is based on $TiO_2$ and is active at a temperature of 300°-350° C. The latter type of catalyst is known from the Claus technology; commercial catalysts are CRS-31 of Rhône-Poulenc and S-949 of Shell. The $TiO_2$-based catalysts are robust, are not rapidly deactivated by the formation of sulfates, and possess a good hydrolytic activity for COS, $CS_2$ and HCN.

Indeed, these last catalysts are preferred for hydrolysing COS/$CS_2$. A problem occurs, however, if the supply gas contains oxygen and/or sulfur dioxide. Catalysts on the basis of chromium oxide are deactivated. Catalysts on the basis of $TiO_2$ or Pt have oxidative properties and will oxidize any $H_2S$ present with the oxygen to form $SO_2$ in accordance with the following reaction:

$$H_2S + 1.5O_2 \rightarrow SO_2 + H_2O \quad (4)$$

$SO_2$, either present or formed, will subsequently produce sulfur in accordance with the Claus reaction:

$$2H_2S + SO_2 \rightarrow 3/S_x + 2H_2O \quad (5)$$

When the process gas is cooled to below 120° C., the sulfur formed will solidify and cause clogging. In addition to these chemical problems, aspects of heat technology become prominent. If process gas of ambient temperature is available, it costs a great deal of energy to increase the temperature by some 250°-300° C., which is required to achieve a good hydrolytic activity. Even if optimum heat economy is used, energy consumption is relatively high. A second problem is that a highly combustible process gas containing $H_2$, $O_2$ and CO should be heated indirectly with hot oil or by means of a furnace, which involves high investments.

It is an object of the present invention to provide a process of the above kind in which these problems do not occur or to a lesser extent only.

For this purpose, the process according to the invention is characterized by (a) a first stage comprising converting a portion of the CO present with water in the presence of a catalyst with simultaneous or subsequent hydrogenation of any $O_2$ and/or $SO_2$ that may be present;

(b) a second stage comprising catalytically hydrolysing COS and/or $CS_2$, possibly in combination with HCN in the gas stream, with water; and (c) a third stage comprising removing substantially all sulfur components from the gas stream;

the catalytic conversion of CO in stage (a) being effected so that the heat thereby produced is substantially sufficient to raise the temperature of the gas stream to the value required for the hydrogenation and for the second stage.

It has surprisingly turned out that, in this way, the gas stream can be raised to the desired hydrolysis temperature without supplying extraneous energy, while at the same time any $SO_2$ and $O_2$ that may be present are converted with $H_2$, which in principle is always present, into water and $H_2S$, that is to say, into non-disturbing components.

It is noted that the combination of a CO shift with hydrolysis is known per se from C & EN, June 4, 1979, pp 27, 28 and 34. According to that publication, all of the CO present is first converted into $CO_2$ and $H_2$, whereafter a hydrolysis of COS, among other compounds, is performed.

In that process, the object of which is to produce as much $H_2$ as possible, it is necessary that a large excess of water, relative to CO, is present in the gas to have the CO shift take place to a sufficient extent. Owing to the equilibrium character of this reaction, generally a molar ratio of $H_2O/CO$ of 2 to 4 is used for an economically acceptable degree of conversion. The greater part of this water is added separately, passes both the CO shift and the hydrolysis, and must then be removed because it may have a disturbing effect in the removal of sulfur. In the process described in the above article, it is additionally necessary to dissipate heat after the CO shift in order that the COS-hydrolysis may proceed in a sufficient degree.

In the process according to the present invention, on the other hand, an insufficient amount of water is used relative to CO, so that substantial conversion of $H_2O$ with CO is achieved, the amount of water being used to control the temperature of the gas stream at the outlet of the first stage, and hence at the inlet of the second stage. Under these conditions intermediate cooling or separation of water is not necessary. On the contrary, generally speaking the water content of the gas stream at the outlet of the first stage is too low to permit the hydrolysis of COS and $CS_2$ to proceed in a sufficient degree, so that steam will be added to the gas stream entering the second stage.

The molar ratio of $H_2O/CO$ is therefore below 1/1 and more particularly below 0.4/1. A suitable lower limit is 0.01/1, preferably 0.02/1.

An additional advantage of the process according to the invention is that, by itself, no problems are involved when the gas to be treated incidentally contains $O_2$ or $SO_2$. In fact, there are several sources of CO containing gases in which it may be difficult to exclude the presence of such gases altogether. Especially when there are disturbances in the procedure, it is quite conceivable that there are intervals in which an amount of $O_2$ and/or $SO_2$ finds its way into the gas. In those situations, the process according to this invention gives a highly effective removal of these gases, so that no separate measures are needed.

Another advantage of the invention is that, as compared with the situation in which there is a complete CO shift, followed by COS hydrolysis, the total gas stream is significantly smaller, owing to the absence of the large excess of water.

According to the invention, the hydrolysis reactor is preceded by an additional catalytic reactor containing a catalyst having hydrogenating properties for the conversion of $O_2$ and $SO_2$ with the $H_2$ present in the gas, in accordance with the following reactions:

$$0.5 O_2 + H_2 \rightarrow H_2O + \text{heat} \quad (6)$$

$$SO_2 + 3H_2 \rightarrow H_2S + 2H_2O + \text{heat} \quad (7)$$

At the same time, the heat necessary to reach the required temperature level of at least 275° C. for the hydrolytic reactions of COS and $CS_2$ is generated by means of the exothermic reaction of CO with steam to form $CO_2$ and $H_2$— the so-called CO shift reaction —in accordance with the following equation:

$$CO + H_2O \rightarrow CO_2 + H_2 + \text{heat} \quad (8)$$

Catalysts having these hydrogenating and CO converting properties and in addition being sulfurresistant are known to those skilled in the art and are often supported catalysts containing Co-Mo, as described, for example, in Catal. Rev. -Sci. Eng. 21(2), 275318 (1980).

It is noted that it is of course possible for these two reactions to be carried out in one and the same catalyst bed, and that the various reactions may partially take place at the same time. It is also possible, however, to use two different catalysts, which are then preferably used in two separate beds, in the same reactor or otherwise.

The process according to this invention starts with a gas stream which in addition to CO, and mostly $H_2$ and $H_2S$, also contains interfering contaminants, such as COS, $CS_2$, HCN, $SO_2$ and/or $O_2$. In addition, of course, other components may be present, which in principle are inert. Such gas streams may originate from all sorts of sources, such as the gasification of coal, coke or oil, but also from all sorts of chemical processes.

The process can be conducted for gases with a practically atmospheric pressure, as well as for gases with a higher pressure. Examples of gases of an atmospheric pressure are gases from a production process of silicon carbide. These gases are released at atmospheric pressure at a temperature of 30°-70° C., and are saturated with water. For further treatment, these gases are increased in pressure to overcome the pressure drop through the plant, and subsequently cooled in a water washing column, where the excess water is condensed and discharged. If supply gas with a higher pressure (30-50 bar) is available, such as gas from a coal gasification plant, the water content is often too low to achieve a sufficient rise in temperature resulting from the CO shift reaction in the first reactor. Reducing the water content by means of a water wash is therefore unnecessary; on the contrary, an additional amount of steam should be supplied.

The temperature of the gas supplied to the first stage, as defined above, will generally be at least 200° C. The feed of the second stage will preferably be at least 25° C. hotter than the feed of the first stage, and is at least 275° C., preferably 275°-400° C.

At lower temperature, the desired reaction does not take place, or insufficiently so, while at higher temperature the reaction equilibrium is too unfavourable. In the first stage, the temperature is controlled by adjusting the water content in the gas stream to a pre-determined value, for example, by injecting steam into the gas or the catalyst bed, or condensing and removing water.

The amount of water is adjusted so that the desired increase in temperature is achieved. This quantity will preferably correspond to the conversion of 1.5-15% by volume of CO, calculated on the total gas stream.

If necessary, steam can be supplied to the second stage in order that sufficient water may be available for the hydrolysis reaction. It is noted in this connection that the hydrolysis reaction will generally be incomplete, by reason of its equilibrium character. Notably for HCN, it is possible that only 50-60% is removed. The final contents of the compounds, COS, $CS_2$, and HCN, however, are generally virtually always below 0.05% by volume for each compound separately.

The amount of water contained in the gas stream at the inlet of the second stage depends upon the quantity of COS and $CS_2$. Preferably, there is rather a large molar excess, for example, a molar ratio of $H_2O/(COS+CS_2)$ of 5 to 20. In view of the fact that the COS and $CS_2$ contents are generally low, this excess of water does not normally lead to problems during the removal of sulfur.

The sulfur removing stage is known to those skilled in the art, and may be based, for example, on absorption, adsorption or selective oxidation. If necessary, the temperature of the gas stream can be adjusted, by means of heat exchange, to the value which is optimal for the removal of sulfur. After the removal of the sulfur components from the gas, the gas can be processed further in known manner, for example, by catalytic or non-catalytic combustion, to generate electricity, heat or power. It is also possible to convert the CO present in the gas with water into $CO_2$ and $H_2$, whereafter the $H_2$ can be used further or recovered, or the gas can be used as a feed gas for a chemical reaction.

The plant equipment is designed for an acceptable pressure drop of the gas being treated. The space velocity, expressed in $Nm^3$ gas per $m^3$ catalyst is selected so as to ensure sufficient contact time for maximum conversion. Thus for the first reactor, in which the CO shift is carried out, a space velocity of 1500–2500 $Nm^2/m^3$ is used. For the second reactor, preferably a space velocity of 1000–1400 $Nm^2/m^3$ is used.

BRIEF DESCRIPTION OF THE DRAWING

The accompanying FIGURE is a flow sheet of the process of the present invention. The supply gas is passed via line 1 to a process gas blower 2. The pressurized process gas is passed through line 3 to water washing column 4 for cooling the process gas with simultaneous water condensation. The circulation circuit for the process gas cooling and water removal comprises the circulating water pump 5, the circulating water cooler 6 and the circulating water filter 7. The condensed water is discharged through line 8. Through line 9, the conditioned process gas is passed to gas/gas heat exchanger 10, where the cold supply gas is heated through the hot product gas from hydrolysis reactor 14. The heated supply gas is passed through line 11 to CO shift reactor 12. Through line 15, steam is added to the gas stream, if desired, in case its water content is too low to achieve the desired CO conversion. In that case, of course, the water condensation plant is superfluous. Accordingly, the water content is adjusted either by condensation or by steam dosaging, the water content being ultimately dictated by the gas temperature at the inlet of reactor 14. Reactor 12 is filled with a Co-Mo catalyst which is active in the hydrolysis of CO with steam to form $CO_2$ and $H_2$, and is capable of hydrogenating contaminants in the supply gas, such as $O_2$ and $SO_2$, to form steam and $H_2S$. Through line 13, the gas is passed through reactor 14, which is filled with a $TiO_2$ catalyst, which catalyses the hydrolysis with steam of COS and $CS_2$ to form $CO_2$ and $H_2S$. Through line 16, additional steam can be supplied to have the hydrolysis reaction proceed more completely. The treated gas is discharged through line 17, cooled in heat exchanger 10, and passed through line 18 to gas cooler 19 for further cooling. The gas thus cooled is then stripped of $H_2S$ in sulfur stripping unit 20. The substantially desulfurized gas stream is passed through line 22 to unit 21. Unit 21 may consist of a CO shift reactor or a catalytic or non-catalytic combustion unit. The gas stream there converted is finally discharged through line 23. The process is illustrated in and by the following examples.

EXAMPLE 1

A quantity of process gas of 12905 kg/h, having a temperature of 42° C., and containing
1.87 vol. % $H_2S$
41.20 vol. % CO
36.02 vol. % $H_2$
9.14 vol. % $CO_2$
6.70 vol. % $H_2O$
0.28 vol. % COS
0.09 vol. % $CS_2$
0.84 vol. % $N_2$
3.36 vol. % $CH_4$
0.30 vol. % $O_2$
0.20 vol. % $SO_2$ is heated, at a pressure of 1.22 bar, to 215° C. in a heat exchanger. Subsequently the gas is passed through a catalyst bed containing a Co-Mo catalyst which catalyses the conversion of CO with steam. The gas leaves the catalyst bed at a temperature of 335° C. and then contains
2.08 vol. % $H_2S$
34.20 vol. % CO
42.22 vol. % $H_2$
16.38 vol. % $CO_2$
0.53 vol. % $H_2O$
0.28 vol. % COS
0.09 vol. % $CS_2$
0.84 vol. % $N_2$
3.38 vol. % $CH_4$ Subsequently, 410 kg/h steam is supplied to the above process gas, whereafter the gas is passed through a second catalyst bed, containing a $TiO_2$ catalyst, which catalyses the hydrolysis of COS and $CS_2$ with steam. The gas leaves this catalyst bed at a temperature of 335° C. and then contains
2.42 vol. % $H_2S$
33.07 vol. % CO
40.82 vol. % $H_2$
16.17 vol. % $CO_2$
3.42 vol. % $H_2O$
0.01 vol. % COS
0.01 vol. % $CS_2$
0.82 vol. % $N_2$
3.26 vol. % $CH_4$ The treated process gas is subsequently cooled to 162° C., through heat exchange with the cold supply gas. The process gas is cooled further to 40° C. in a gas cooler, whereafter the gas is stripped of $H_2S$ in a desulfurizing plant, and subsequently combusted to generate electricity.

EXAMPLE 2

A quantity of process gas of 310925 kg/h, having a temperature of 79° C., and containing
1.36 vol. % $H_2S$
66.61 vol. % CO
27.81 vol. % $H_2$
1.63 vol. % $CO_2$
1.47 vol. % $H_2O$
0.16 vol. % COS
0.04 vol. % $NH_3$
0.87 vol. % $N_2$
0.02 vol. % $CH_4$
0.03 vol. % HCN is heated, at a pressure of 32 bar to 267° C. in a heat exchanger. 3080 kg/h of steam is added to the process gas.

Subsequently, the gas is passed through a catalyst bed containing a Co-Mo catalyst, which catalyses the conversion of CO with steam. The gas leaves the catalyst bed at a temperature of 300° C. and then contains the following ingredients:

1.35 vol.% $H_2S$
63.29 vol.% CO
30.04 vol.% $H_2$
4.16 vol.% $CO_2$
0.05 vol.% $H_2O$
0.16 vol.% COS
0.04 vol.% $NH_3$
0.86 vol.% $N_2$
0.02 vol.% $CH_4$
0.03 vol.% HCN Subsequently, 5070 kg/h of steam is added to the above process gas, whereafter the gas is passed through a second catalyst bed containing a catalyst which catalyses the conversion of COS and HCN with steam. The gas leaves this catalyst bed at a temperature of 300° C., and then contains 1.45 vol.% $H_2S$
62.15 vol.% CO
29.48 vol.% $H_2$
4.22 vol.% $CO_2$
1.74 vol.% $H_2O$
0.02 vol.% COS
0.06 vol.% $NH_3$
0.85 vol.% $N_2$
0.02 vol.% $CH_4$
0.01 vol.% HCN The treated process gas is subsequently cooled to 112° C. by heat exchange with the cold supply gas. The process gas is cooled further to 40° C. in a gas cooler, whereafter the gas is stripped of $H_2S$ in a desulfurizing plant. The gas substantially stripped of sulfur compounds is subsequently converted into gas having a high $H_2$ content in a CO shift reactor.

We claim:

1. A process for converting carbon oxysulfide and carbon disulfide, contained in a reducing CO containing gas stream, by the catalytic hydrolysis of COS and $CS_2$ to $CO_2$ and $H_2S$, followed by the removal of $H_2S$, present and formed, from the gas stream, characterized by
   (a) a first stage comprising converting to $CO_2$ and $H_2$, a portion of the CO present with water in the presence of a catalyst with simultaneous or subsequent hydrogenation of any $O_2$ and $SO_2$ that may be present;
   (b) a second stage comprising catalytically hydrolysing COS and $CS_2$ to $CO_2$ and $H_2S$, with water; and
   (c) a third stage comprising removing substantially all sulfur components from the gas stream; the catalytic conversion of CO to $CO_2$ and $H_2$ in stage (a) being effected so that the heat thereby produced is substantially sufficient to raise the temperature of the gas stream to the value required for the hydrogenation and for the second stage.

2. A process as claimed in claim 1, characterized in that the conversion of CO to $CO_2$ and $H_2$ and the hydrogenation of COS and $CS_2$ to $CO_2$ and $H_2S$ are carried out in combination in the presence of the same catalyst.

3. A process as claimed in claim 1, characterized in that the temperature of the gas stream at the inlet of stage (a) is at least 200° C.

4. A process as claimed in claim 1, characterized in that the temperature of the gas stream at the inlet of stage (b) is at least 275° C.

5. A process as claimed in claim 4, characterized in that said temperature ranges between 275° and 400° C.

6. A process as claimed in any claim 1, characterized in that the gas stream supplied to stage (a) is heated with the gas stream from stage (b).

7. A process as claimed in claim 1, characterized in that the removal of sulfur compounds is effected by selective oxidation to substantially elemental sulfur or by absorption.

8. A process as claimed in claim 1, characterized in that the catalytic conversion in stage (a) is effected in the presence of a cobalt-molybdenum containing catalyst.

9. A process as claimed in claim 1, characterized in that the hydrolysis in stage (b) is effected in the presence of a $TiO_2$ containing catalyst.

10. A process as claimed in claim 1, characterized in that the degree of conversion of CO to $CO_2$ and $H_2$ in the first stage is controlled by adjusting the water content of the gas stream.

11. A process as claimed in claim 10, characterized in that the water content of the gas being treated is controlled at a pre-determined value by adding steam or condensing water.

12. A process as claimed in claim 1, characterized by adding so much steam to the second stage that the molar ratio of $H_2O$ to $(COS+CS_2)$ in the supply gas ranges between 5 and 20.

13. A process as claimed in claim 1, characterized in that the gas stream substantially stripped of sulfur components, from the third stage, is subjected to a substantially complete conversion of CO with water, is catalytically or non-catalytically combusted, or, possibly after the pre-treatment, used as a supply gas for a chemical reaction.

14. The process of claim 1 wherein said reducing CO containing gas stream comprises HCN, $O_2$ and $SO_2$.

* * * * *

UNITED STATES PATENT AND TRADEMARK OFFICE
CERTIFICATE OF CORRECTION

PATENT NO. : 4,981,661
DATED : January 1, 1991
INVENTOR(S) : Johannes Borsboon and Jan A. Lagas It is certified that error appears in the above-identified patent and that said Letters Patent is hereby corrected as shown below:

Column 2, line 17, "1.5O$_2$" should read --1.5 O$_2$--.

Column 2, line 22, "3/S$_x$" should read --3/x S$_x$--.

Column 3, line 53, "0.5O$_2$" should read --0.5 O$_2$--.

Column 7, line 10, "H$_2$s" should read --H$_2$S--.

Signed and Sealed this

First Day of September, 1992

Attest:

DOUGLAS B. COMER

Attesting Officer     Acting Commissioner of Patents and Trademarks